US008678398B2

(12) United States Patent
Anderson et al.

(10) Patent No.: US 8,678,398 B2
(45) Date of Patent: Mar. 25, 2014

(54) ISOLATION GASKET, SYSTEM AND METHOD OF MANUFACTURE

(75) Inventors: Thornton J. Anderson, Denver, CO (US); Ben D. Kramer, Littleton, CO (US); Sigfrid Ruz, Denver, CO (US); T. Scott Tanner, Rochester, NY (US)

(73) Assignee: Garlock Pipeline Technologies, Inc., Lakewood, CO (US)

( * ) Notice: Subject to any disclaimer, the term of this patent is extended or adjusted under 35 U.S.C. 154(b) by 14 days.

(21) Appl. No.: 13/180,411

(22) Filed: Jul. 11, 2011

(65) Prior Publication Data

US 2011/0266755 A1  Nov. 3, 2011

Related U.S. Application Data

(62) Division of application No. 12/058,498, filed on Mar. 28, 2008, now Pat. No. 7,976,074.

(51) Int. Cl.
*F16L 15/02* (2006.01)

(52) U.S. Cl.
USPC ............................ 277/608; 277/611; 277/647

(58) Field of Classification Search
USPC .......... 277/608, 609, 611, 616, 647; 285/364, 285/368, 406, 412, 910, 110, 111, 113
See application file for complete search history.

(56) References Cited

U.S. PATENT DOCUMENTS

| | | | |
|---|---|---|---|
| 3,561,793 A | 2/1971 | Rode | |
| 3,595,588 A * | 7/1971 | Rode | 277/650 |
| 3,869,132 A * | 3/1975 | Taylor et al. | 277/608 |
| 4,406,467 A | 9/1983 | Burger et al. | |
| 4,776,600 A | 10/1988 | Kohn | |
| 5,316,320 A | 5/1994 | Breaker | |
| 5,427,386 A * | 6/1995 | Breaker | 277/627 |
| 5,551,703 A | 9/1996 | Morvant | |
| 5,564,715 A | 10/1996 | Wallace | |
| 5,758,882 A | 6/1998 | Torzewski | |
| 5,938,246 A * | 8/1999 | Wallace et al. | 285/351 |
| 5,984,316 A | 11/1999 | Balsells | |
| 6,091,175 A | 7/2000 | Kinsinger | |

(Continued)

FOREIGN PATENT DOCUMENTS

WO  2006107798 A1  10/2006

OTHER PUBLICATIONS

International Searching Authority, "Notification of Transmittal of the International Search Report and the Written Opinion of the International Searching Authority, or the Declaration," mailed May 8, 2009 for Appl. No. PCT/US2009/038655.

*Primary Examiner* — Gilbert Lee
(74) *Attorney, Agent, or Firm* — Perkins Coie LLP

(57) ABSTRACT

Sealing systems for high pressure applications that provide electrical isolation between joined elements as well as enhanced resistance to leakage of media during a fire. High pressure sealing is accomplished using a metallic core to which an electrically isolating material is bonded on either or both sides. Sealing is achieved through a dielectric sealing element, such as a spring-loaded polytetrafluoroethylene (PTFE) ring. Flanges of the joint may be bolted together with the seal interposed therebetween, and the flanges bolted together. In the event of a fire, heat may be generated that is at a high enough temperature to burn away the isolating material and PTFE ring. Systems of various embodiments provide a metal core backup seal and a compression limiter, which, respectively, prevent the media from leaking from the joint and maintain bolt load at the flanges.

15 Claims, 10 Drawing Sheets

(56) References Cited

U.S. PATENT DOCUMENTS

| | | |
|---|---|---|
| 6,322,087 B1 | 11/2001 | Swensen et al. |
| 6,402,159 B1 | 6/2002 | Kohn |
| 6,419,237 B1 | 7/2002 | More |
| 6,695,357 B2 | 2/2004 | Schenk et al. |
| 6,814,358 B2 | 11/2004 | Keck |
| 2005/0194750 A1 | 9/2005 | Wallace |
| 2006/0220324 A1 | 10/2006 | Anderson et al. |
| 2007/0216111 A1 | 9/2007 | Matsui |

* cited by examiner

ISOLATION GASKET, SYSTEM AND METHOD OF MANUFACTURE

CROSS-REFERENCE TO RELATED APPLICATIONS

This application is a divisional of U.S. patent application Ser. No. 12/058,498 filed Mar. 28, 2008, entitled "Isolation Gasket, System, and Method of Manufacture," the disclosure of which is incorporated herein by reference in its entirety.

FIELD

The present invention relates generally to an isolation gasket which is adapted to be interposed and compressed between joined pieces of pipe in a flow line that is operative for fluid flow therethrough without leakage. More particularly, the present invention is directed to an electrical isolation gasket that is part of a seal system which is particularly useful in high pressure, high temperature and/or highly corrosive environments. The seal device of the present disclosure is specifically adapted to provide enhanced fire resistance and electrical isolation between joined pipe sections.

BACKGROUND

Seal systems using gasket devices are well known and have been used in a variety of applications to prevent fluid from leaking between joined pieces. For example, a seal device is interposed and compressed between flanged end connections of a flow line. In some cases, in-line process control equipment is to be installed at various points in a flow line, and may be associated with flanged end connections of a flow line. In-line process control equipment may include such things as valves, pumps, flow meters, temperature controllers, pressure controllers and the like. In addition, ends of pipe sections are provided with flanges so that the sections may be connected, end-to-end, to form the flow line. It is known to provide gasket devices at the interfaces of the joined sections to prevent leakage of the fluid at the joint.

Regardless of the nature of the joint, that is, whether it is between the joined sections of pipe or whether the joint is used to connect in-line process control equipment, it is desirable for a gasket device and seal system to be selected based on various factors that are associated with a particular joint and the particular media that is conveyed through the joint. These factors include the corrosive nature of the media flowing through the pipe line as well as the physical characteristics of that flowing media. Such physical characteristics include the pressure, temperature and velocity of the media. Additionally, in many cases it is also necessary not only to provide a reliable seal for the joint but also electrically isolate one side of the joint from the other. For example, a well known method of corrosion resistance for pipelines is cathodic protection. This method of corrosion protection requires sealing joints that provide electrical isolation. Another example is when two sides of the joint are of dissimilar metals. In this case the electrical potential difference between the two metals can create a galvanic corrosion cell if the two sides are not electrically isolated. Finally, it is also desirable for a sealing joint to provide an effective seal during the event of a fire. Fires pose a very serious threat to the safety of the pipeline workers and become even more dangerous if the sealing elements between joints are not capable of containing the media during a fire.

Therefore, flow line sealing systems face numerous challenges. For example, many materials which resist corrosive gases are not suitable for high pressure applications since the materials deform. Materials which are less prone to deformation, such as a graphite filled spiral wound metal seal, conduct electricity. Many materials that are used to create seal systems may melt at high temperatures, such as those that would result in a fire, so that the seal between flanges is compromised. This is an extremely dangerous situation since compromise of the seal system allows the media, such as a petroleum or gas product, to rapidly leak from the flow line which can increase the available combustion products for such a fire. Therefore, a sealing system that can contain high pressures, electrically isolate and provide safety during a fire would be a significant improvement in the field of effective flow line sealing.

SUMMARY

The present disclosure recognizes that a sealing system that can contain high pressures, electrically isolate and provide safety during a fire would be a significant improvement in the field of effective flow line sealing. Embodiments disclosed herein provide sealing systems for high pressure applications that provide electrical isolation between joined elements as well as enhanced resistance to leakage of media during a fire. High pressure sealing is accomplished using a metallic core to which an electrically isolating material is bonded on either or both sides. Sealing is achieved through a dielectric sealing element, such as a spring-loaded polytetrafluoroethylene (PTFE) ring. Flanges of the joint may be bolted together with the seal interposed therebetween, and the flanges bolted together. In the event of a fire, heat may be generated that is at a high enough temperature to burn away the isolating material and PTFE ring. Systems of various embodiments provide a metal core backup seal and a compression limiter, which, respectively, prevent the media from leaking from the joint.

One aspect of the present disclosure provides an isolation device for use between joined pieces in a flow line that is operative for fluid passage therethrough without leakage. The isolation device of this aspect comprises, for example, a flat metal plate, such as a flat annular metal plate, having opposing side surfaces and an opening formed in the metal plate to allow passage of fluid therethrough. In addition, a sheet of dielectric material is disposed on at least one side surface of the metal plate. Further, an inner groove and an outer groove are formed on the side surface or surfaces on which the sheet of dielectric material is disposed, which penetrate through the dielectric material and into the metal plate and which extend completely around the opening formed in the metal plate. A primary seal element is disposed in the inner groove, and a secondary seal element is disposed in the outer groove and there is a compression limiter acting on this seal in some manner, for example, it could be disposed in the outer groove or it could be the gasket retainer itself.

According to embodiments of the invention, grooves formed on the side surface or surfaces on which the sheet of dielectric material is disposed can have a cross section that is, for example, a rectangular shape, an isosceles trapezoid shape, a trapezoid shape, or a parallelogram shape. According to other embodiments of the invention, the primary seal element disposed in the inner groove can be, for example, a spring energized PTFE lip seal or an O-ring seal element. According to further embodiments, the secondary seal element disposed in the outer groove can be, for example, an annular metal body seal element having an E-shaped or C-shaped cross section, and the annular metal body seal element can additionally be provided with a coating of isolating material. In further embodiments, the compression limiter that could be disposed in the outer groove is disposed adjacent to the secondary seal element and could be an annular metal ring having a substantially rectangular cross section, and the compression limiter can additionally be provided with a coating of isolating material. According to further embodiments, the compression limiting action can also be provided by the gasket's dielectric facing material if the groove depth and seal cross section are properly sized.

Other aspects of the present disclosure provide an electrical isolation system between joined flange pieces, each of which has an inner and an outer face, in a flow line that is operative for fluid passage therethrough without leakage which utilizing, for example, a flat metal gasket with an opening formed therein to allow fluid passage therethrough, which flat metal gasket has opposing side surfaces on which are laminated sheets of dielectric material, each of which side surfaces has portions defining inner and outer grooves that penetrate through the layer of dielectric material and into the metal plate and extends completely around the opening, the inner groove having a primary seal element disposed therein and the outer groove having a secondary seal element and a compression limiter acting on said secondary seal.

In further aspects, the present disclosure provides use of gaskets in combination, for example, with at least one isolating sleeve receivable in an aligned bore formed in each of the joined flange pieces, which sleeve has a length that is substantially equal to a distance between the outer faces of the joined flange pieces with the gasket interposed therebetween. The isolating sleeve can be made, for example, of glass reinforced polymer material, epoxy material, phenolic material, or meta-aramid material. Further, such other embodiments include, for example, at least one elongate metal fastener with opposing ends, such as a headed metal bolt with threads for receiving a nut, which fastener is receivable in the isolating sleeve for connecting the joined flange pieces to one another with the flat metal gasket interposed therebetween.

Such aspects further comprise, for example, at least one washer made wholly or partly of materials having electrical isolation properties, such as a sheet of dielectric material laminated to one side of an annular washer substrate or a metal washer coated with a dielectric material, which washer is receivable on the elongated metal fastener with the electrical isolation material abutting one of the flange piece outer faces.

Still further aspects of the present disclosure provide an electrical isolation device that comprises a flat metal plate having opposing side surfaces and an opening formed therein to allow fluid passage therethrough, a layer of dielectric material disposed on one or both of the opposing side surfaces, at least an inner groove and an outer groove formed on the side surface or surfaces on which the sheet of dielectric material is disposed which penetrates through the dielectric material and into the metal plate and which extends completely around the opening formed in the metal plate. An annular primary seal element is disposed in the inner groove, and an annular secondary seal and a compression limiter acting on said secondary seal is disposed in the outer groove.

These and other advantages and novel features of the disclosure will be set forth in part in the description which follows, which discloses various embodiments, including the currently preferred embodiment.

DETAILED DESCRIPTION

Figure 1:
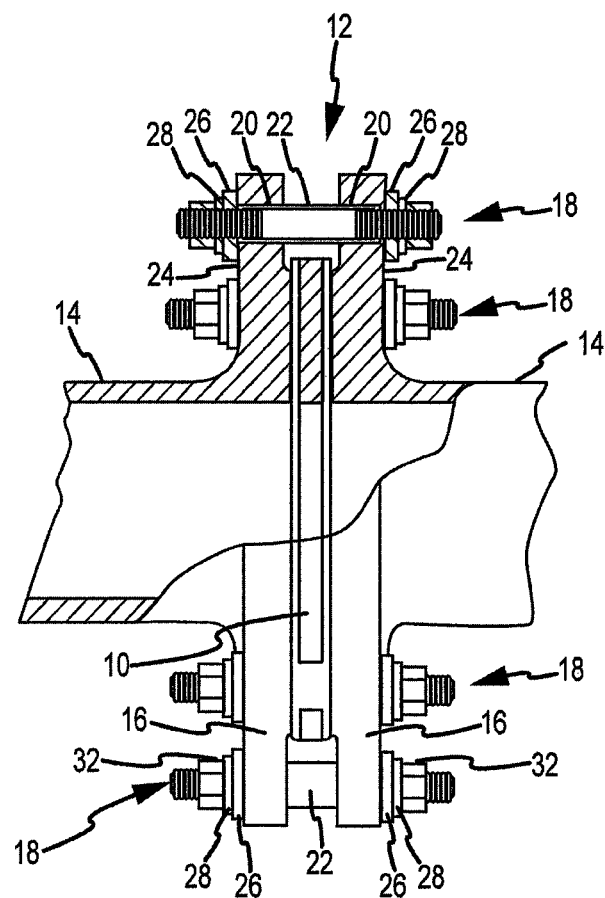
FIG. 1 is a side view in elevation and partial cross-section showing the isolation gasket and sealing system according to a first exemplary embodiment of the present disclosure.

For a more complete understanding of this invention, reference is now made to the following detailed description of several embodiments as illustrated in the drawing figures, in which like numbers represent the same or similar elements. Various embodiments are described herein, with specific examples provided in many instances to serve to illustrate and discuss various concepts included in the present disclosure. The specific embodiments and examples provided are not necessarily to be construed as preferred or advantageous over other embodiments and/or examples.

The present invention is generally directed to an isolation gasket adapted to be used between two flanges in a flow line application. Such flanges may be the flange connection between two sections of pipeline which are connected in end-to-end relation. Alternatively, such flanges may be those used to connect monitoring equipment to the flow line. Accordingly, such a flange connection will be introduced in reference to the end-to-end connection of a pair of pipeline sections, but it should be clearly understood that the present invention is not limited to such applications. Thus, for example, as is illustrated in FIG. 1, an isolation gasket 10 is located in a flange connection 12 between two pipe sections 14 in a flow line application. Each of the pipe sections 14 includes flanges 16 which may be placed in confronting relationship with gasket 10 therebetween. Flanges 16 are provided with bores 20 which align with one another so that flanges 16 may be connected by nut and bolt sets 18, as is known in the art.

Figure 2:
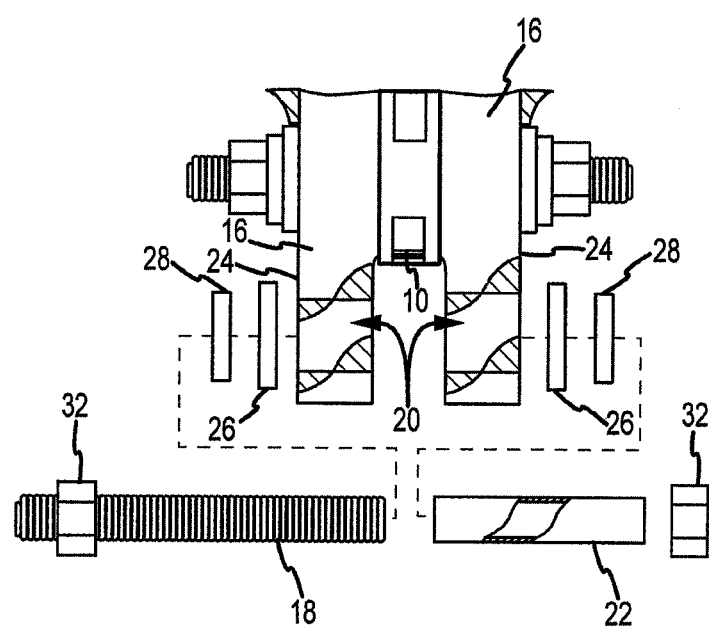
FIG. 2 is an enlarged side view in partial cross-section showing a representative nut and bolt set used with various isolating components for electrically isolating a flange joint for various exemplary embodiments.
Figure 3:
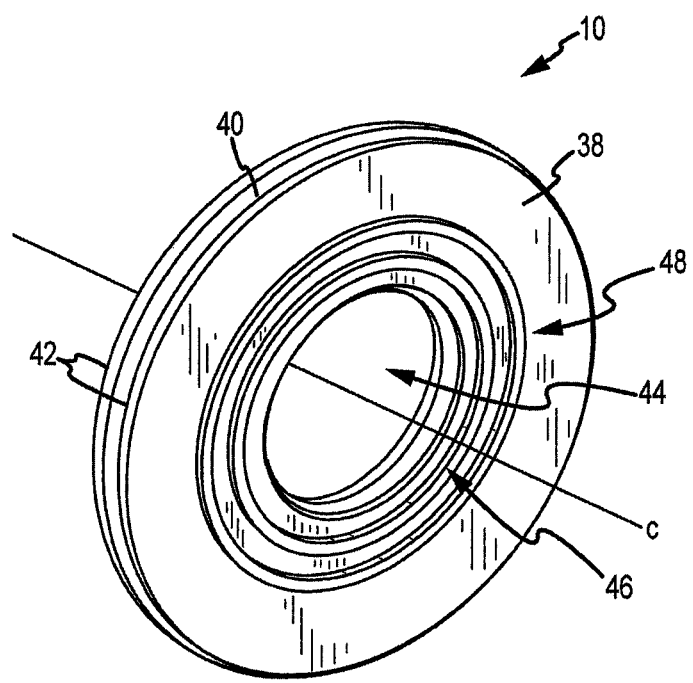
FIG. 3 is a perspective view of an isolation gasket according to an exemplary embodiment.

With continued reference to FIG. 1, and with reference to FIG. 2, it may be seen that electrical isolation between flanges 16 is accomplished by a plurality of different components associated with each aligned pair of bores 20. Here, a pair of aligned bores 20 is provided with a sleeve 22 constructed, for example, of a glass reinforced polymer although other materials, such as epoxy, phenolic and nomex materials may be suitably employed. Sleeve 22 is dimensioned to have a length that is about the same as the distance between outer surfaces 24 of flanges 16 with gasket 10 interposed therebetween. Once sleeve 22 has been inserted into a pair of aligned bores 20, isolating washers 26 are placed on either side of bores 20 on outer surfaces 24 of flanges 16. In this embodiment, optional metal washers 28 are then positioned against washer 26 and bolt 18 is passed through the washers and sleeve 22 after which it is secured by nuts 32. This assembly is undertaken for each of the aligned bores 20 after which nuts 32 may be tightened to compress gasket 10 at a desired pressure.

Various embodiments described herein contemplate an isolation gasket 10, isolating washers 26, and sleeves 22 to provide electrical isolation of separate pipe sections 14. Isolating washers 26, as illustrated in FIGS. 1-2, is positioned against outer surfaces 24 of flanges 16 and, in combination with sleeve 22, provide electrical isolation between the nut and bolt sets 18 and the flanges 16. The isolating washers 26 may be metal core washers that are coated with a dielectric material.

Figure 4:
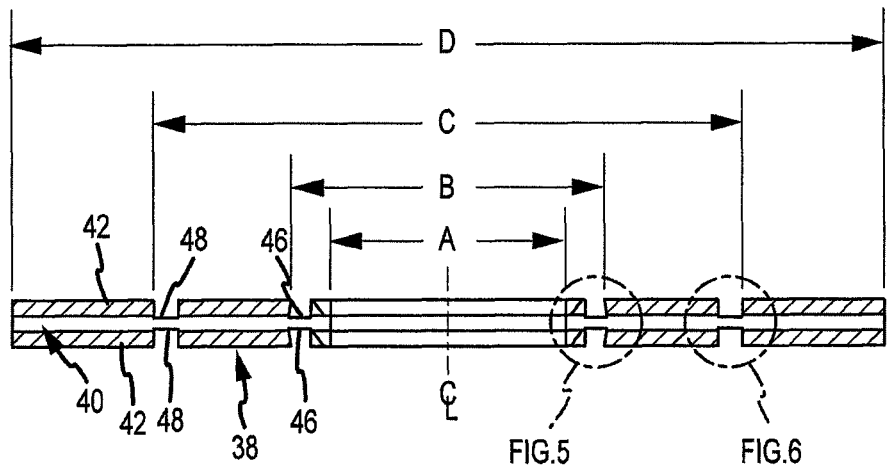
FIG. 4 is an exploded cross-sectional view of the isolation gasket of FIG. 3 for an exemplary embodiment.
Figure 5:
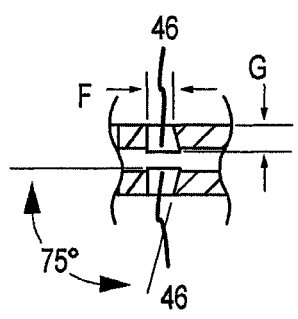
FIG. 5 is an enlarged cross-sectional view of an inner seal groove of the isolation gasket of various exemplary embodiments.
Figure 6:
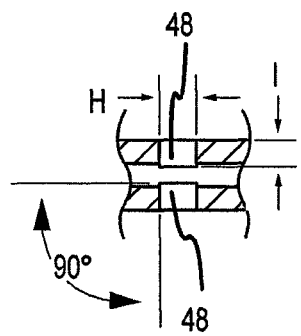
FIG. 6 is an enlarged cross-sectional view of an outer seal groove of the isolation gasket of various exemplary embodiments.

Illustrated in FIGS. 3-6, the construction of isolation gasket 10 is described, for an exemplary embodiment. In this embodiment, isolation gasket 10 includes the gasket body 38 formed by a flat annular metal plate 40 having an opening 44 therethrough to allow fluid passage in a flow line application. In one embodiment, the metal plate 40 is formed from 11 gauge stainless steel. Dielectric linings 42 are laminated on each outer surface of metal plate 40. As illustrated in FIG. 4, a pair of grooves 46 and 48, in this embodiment, are formed on a surface of gasket body 38 with each of these grooves penetrating through the dielectric linings 42 and into metal plate 40. Groove 48, as illustrated, has a larger diameter than groove 46 so that grooves 46 and 48 are radially offset from one another relative to opening 44. Groove 46 may be referred to as inner groove 46, and groove 48 may be referred to as outer groove 48. In the embodiment illustrated in FIGS. 4-6, the gasket body 38 has various dimensions illustrated. As will be understood, these dimensions are illustrative of but one embodiment, and are provided for purposes of illustration and discussion only. One skilled in the art will readily recognize that numerous variations may exist for various different applications and different sizes of flow lines. In this embodiment a 6 inch (15.24 cm) gasket has an opening 44 with a diameter A of 6.000 inches (15.24 cm), an inner groove 46 diameter B of 6.565 inches (16.68 cm), an outer groove 48 diameter C of 7.838 inches (19.91 cm), and a total diameter D of 9.813 inches (24.93 cm). The total thickness E of gasket body 38 is 0.308 inches (7.82 mm), which comprises a core thickness of 0.120 inches (3.05 mm), and a dielectric coating thickness of 0.093 inches (2.36 mm) on each surface. Inner groove 46, illustrated in the detail view of FIG. 5, has a width F of 0.150 inches (3.81 mm), and a depth G of 0.111 inches (2.82 mm). In this embodiment, the radially outward side of groove 46 is beveled at an angle of 75 degrees. Such a beveled surface provides enhanced retention of a seal that is disposed in the inner groove 46, and as will be discussed in more detail below. The outer groove 48 of this embodiment is illustrated in the detail view of FIG. 6, and has a width H of 0.111 inches-0.252 inches (2.82 mm-6.40 mm), and a depth I of 0.093-0.123 inches (2.36-3.12 mm). As will be understood, the dimensions of the embodiment of FIGS. 3-6 are exemplary, and other suitable dimensions may be used in various different applications as will be readily apparent to one skilled in the art.

Figure 7:
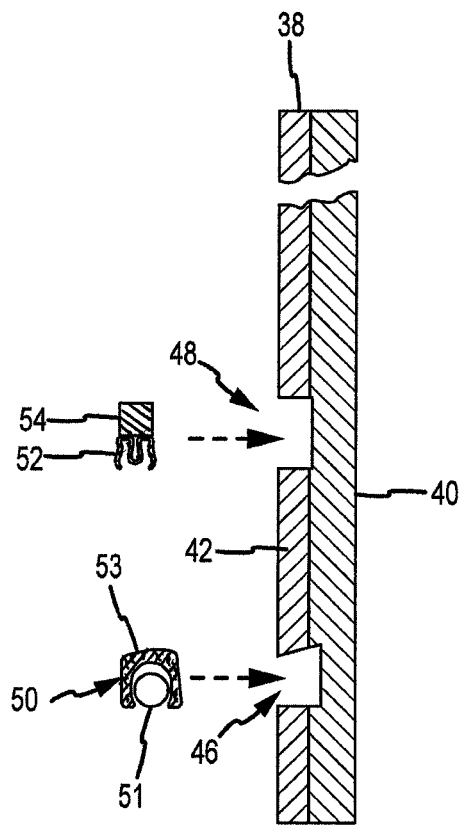
FIG. 7 is a cross-sectional view of a portion of an isolation gasket according to another exemplary embodiment.

As illustrated in FIG. 7, suitable seals 50 and 52 are sized and adapted to be nested in respective grooves 46 and 48. Seal 50 is disposed in the inner groove 46, and may be referred to as primary seal 50, because in this embodiment seal 50 provides the primary sealing for the gasket when installed in a joint. Primary seal 50, in an embodiment, is a lip seal comprised of a PTFE material having a spring 51 located therein to provide structural support to the seal 50. The primary seal 50, as illustrated, is a lip seal that prevents media from passing and is fitted to be seated into groove 46. Groove 46 has a half-dovetail configuration such that, when media applies pressure to seal 50, the seal 50 is pressured against the inside surface of the half-dovetail groove 46 and thus forced into the groove 46. The seal 50, in this embodiment, includes a beveled edge 53 that helps seat seal 50 in groove 46. Seal 52 is disposed in the outer groove 48, and may be referred to as a backup or secondary seal 52, because in this embodiment seal 52 is not exposed to media unless there is a failure in the primary seal 50. The secondary seal 52, in this embodiment, is comprised of a metal seal having an E-shape, also referred to as an E-ring seal. The secondary seal 52, in various embodiments, has a coating of PTFE thereon to provide electrical isolation. Such a PTFE coating may be, for example, three to five mils (0.076-0.127 mm) on an E-ring made of 0.0095 inch (2.41 mm) thick Inconel material. A compression limiter 54 could also be disposed in the outer groove 48. The compression limiter 54, as illustrated in the embodiment of FIG. 7, may be located in the outer groove 48 adjacent to the secondary seal 52. A compression limiter may also be integrated such that it is the gasket retainer itself. In an exemplary embodiment, the compression limiter 54 is formed of carbon steel and is coated with a dielectric material such as ECTFE (Ethylene-ChloroTriFluoro-Ethylene). The compression limiter 54 has a thickness that corresponds with the depth of outer groove 48.

In normal operation, a gasket body 38 is installed in a flow line joint, with primary seal 50 containing the media within the joint. In the event of a failure of the primary seal 50, secondary seal 52 contains the media within the joint. As discussed above, a common application for such gaskets is in high pressure hydrocarbon pipelines, such as oil and gas pipelines. Also as discussed above, a significant concern for such pipelines is fire, and it is desirable to have a gasket that will maintain a seal even in the event of a significant fire. The gasket of the embodiments of FIGS. 3-7 provides enhanced performance in the event of a fire. In such an event, high temperatures of the fire may melt or burn away the primary seal 50 as well as the dielectric coating 42 on the gasket body 38. Thus the primary seal 50 fails, but secondary seal 52, being formed of a metal, maintains the media within the joint. As mentioned, the loss of the dielectric coating 42 also may occur, which results in the gasket thickness E being reduced. Compression limiter 54 acts to maintain a virtual gasket thickness E in such an event, which acts to help maintain the appropriate loads on the bolts 18 that hold the flanges 16 of the joint together and not allow the secondary seal to be over compressed due to the gasket thickness E being reduced. In the absence of a compression limiter 50, when dielectric coating 42 is reduced, the bolt load on bolts 18 is also reduced, thereby resulting in a loose joint which may result in media leaking from the joint. Thus in such a situation, a compression limiter, such as compression limiter 50, acts to help maintain bolt load and not allow the seal to be over compressed. In the event of a fire and the loss of the isolating dielectric coating 42, the sides of the joint are no longer electrically isolated, however, such an event will require repair of the flow line and replacement of the gasket in any event.

Figure 8A:
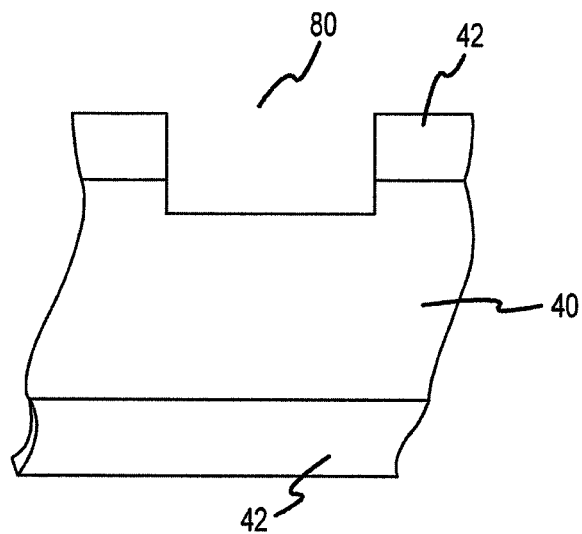
FIG. 8(a)-8(d) are cross-sectional views diagramming various groove cross-sections that may be used with the isolation gaskets of various different embodiments.
Figure 8B:
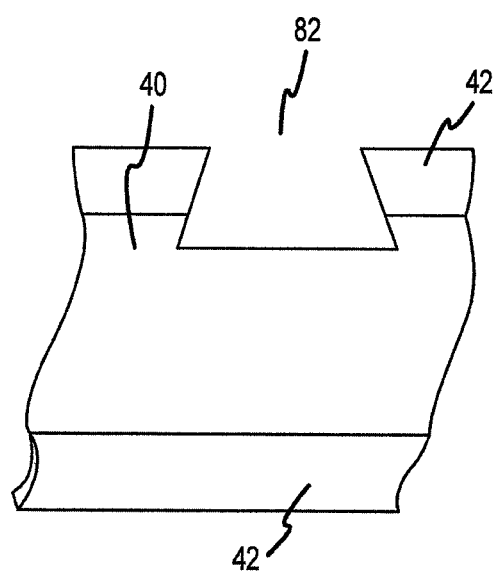
Figure 8C:
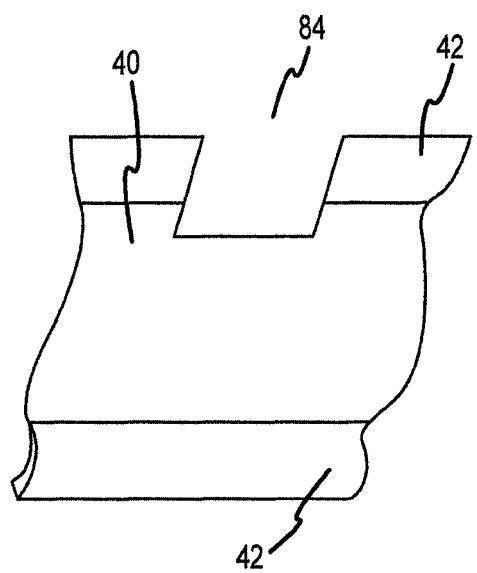
Figure 8D:
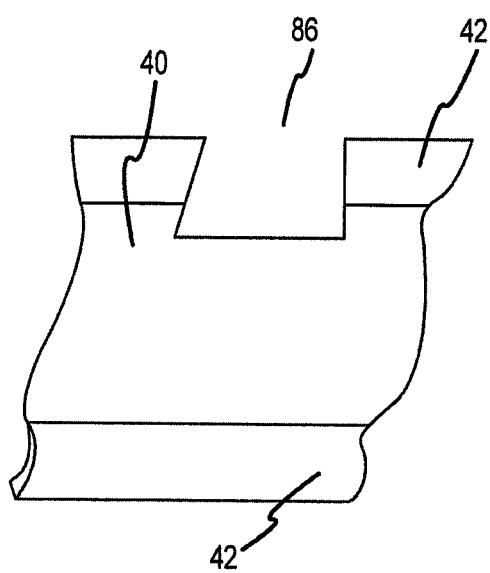

With reference now to FIGS. 8(a)-8(d), it should be appreciated that various configurations of grooves, such as grooves 46 and 48 may be employed with the present invention. For example, in FIG. 8(a) groove 80 is a rectangular cross-section groove formed through dielectric material 42 and into metal core 40. FIG. 8(b) provides a groove 82 that is a trapezoidal dovetail configuration. Groove 82 is again cut through dielectric layer 42 and into metal core 40. In FIG. 8(c), groove 84 has the cross-section of a parallelogram and is again formed through isolating layer 42 and into metal core 40. Finally, FIG. 8(d) illustrates a trapezoidal groove 86 having one side thereof oriented at a right angle to the base. Groove 86 is cut through dielectric layer 42 and into metal core 40. One skilled in the art will readily recognize that such groove configurations are exemplary only, and that other groove configurations may be used.

Figure 9:
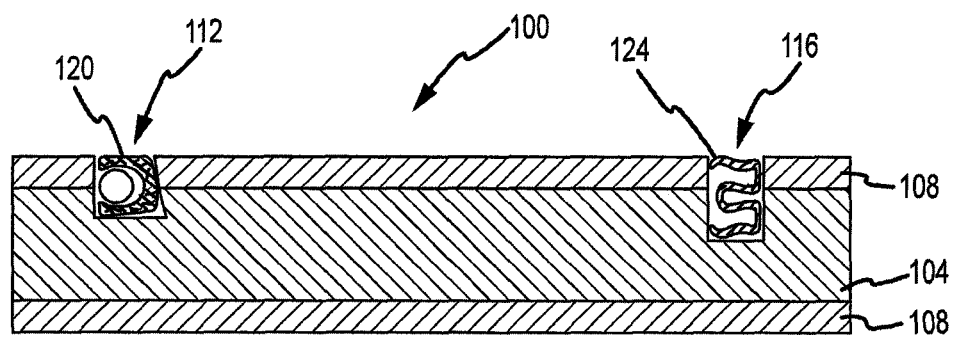
FIG. 9 is a cross-sectional view partially broken away of an isolation gasket according to a further exemplary embodiment.

With reference now to FIG. 9, another exemplary embodiment is described. FIG. 9 is a cross-sectional illustration of one half of a gasket 100. Illustrated in FIG. 9, is a gasket 100 comprising a metal core 104 and dielectric layers 108 on each side of the metal core. Inner groove 112 and outer groove 116 are formed in the gasket 100, each of which extending through the dielectric layer 108 and into metal core 104. In some embodiments, inner groove 112 may not penetrate entirely through dielectric layer 108, and outer groove 116 may penetrate through the dielectric layer 108 and into the metal core 104. As illustrated in FIG. 9, suitable seals 120 and 124 are sized and adapted to be nested in respective grooves 112 and 116. Seal 120 is disposed in the inner groove 112, and may be referred to as primary seal because in this embodiment seal 120 provides the primary sealing for the gasket when installed in a joint. Primary seal 120, in an embodiment, is comprised of a PTFE material having a spring located therein to provide structural support to the seal 120. The primary seal 120 may, in operation, be a lip seal that prevents media from passing. Seal 124 is disposed in the outer groove 116, and may be referred to as a backup or secondary seal 124, because in this embodiment seal 124 is not exposed to media unless there is a failure in the primary seal 120. The secondary seal 124, in this embodiment, is comprised of a metal seal having an E-shape, also referred to as an E-ring seal. The secondary seal 124, in various embodiments, has a dielectric coating thereon to provide electrical isolation. Such a coating may be, for example, a PTFE coating that is three to five mils (0.076-0.127 mm) in thickness on an E-ring made of metal. The gasket 100 of this embodiment has varying depths of the inner groove 112 and outer groove 116, thereby providing a compression limiter for the secondary seal 124. In such a manner, if dielectric layers 108 are reduced, the metal core 104 will remain, with secondary seal 124 disposed in the outer groove 116. The depth of the outer groove 116 into the metal core 104 is such that the secondary seal 124 is less likely to be over compressed, and thus will continue to provide a seal.

In another embodiment, the gasket may include a single groove rather than dual grooves. In such an embodiment, the gasket, similarly as described above, may include a metal core and dielectric layers on each side of the metal core. The single groove may be formed in the gasket, extending through the dielectric layer and into metal core. A single seal is adapted to be nested in the single groove. In such an embodiment, the single seal is comprised of a metal seal having an E-shape, also referred to as an E-ring seal, although other configurations may be used. The single seal of such an embodiment may have a dielectric coating thereon to provide electrical isolation. Such a coating may be, for example, a PTFE coating that is three to five mils (0.076-0.127 mm) in thickness on an E-ring made of metal. The gasket of such an embodiment may also provide a compression limiter for the single seal. Such a compression limiter may include any compression limiter such as described above, such as carbon steel coated with a dielectric material, or the configuration of the depth of the groove relative to the metal core such that the single seal 124 is less likely to be over compressed in the even that the dielectric layer is reduced.

As will be appreciated by those skilled in the art, industries such as the oil and gas industry utilize many, many miles of connected metal pipelines that are subjected, for example, to a natural flow of current through the pipeline and across the metal-to-metal flange connections in the pipeline which causes the flange connections to corrode and build up corrosion similar to battery terminals. The isolation gasket for embodiments of the invention interrupts that current flow through a pipeline and prevents the flanges from corroding and building up corrosion in the way in which they would with a metal-to-metal seal.

It is to be understood that embodiments of the invention cover a wide range of applications, including without limitation, not only isolation but also potential fire safety, such as fire sealing applications. In that regard, combinations including washers for embodiments of the invention are significant aspects of the invention because, for example, if the washer material deforms or begins to flow because of heat, bolt load will be lost. If the bolt load is lost, there is no longer any compression in the joint between the two flanges in the flow line, which means the gasket no longer seals the joint. Further to this point, having a dielectric coating on the face of the gasket body that eventually loses thickness due to fire can result in over compression of metal formed seals. Thus a compression limiter of some type is provided to help both bolt load loss and seal over compression.

It is to be further understood that a method of making the gasket material for embodiments of the invention involves bonding the dielectric lining material to both sides of the metal substrate in large sheets to assure uniformity of the lamination. According to such a method, a water jet is thereafter utilized to cut appropriately dimensioned I.D and O.D. circles for gaskets out of the large sheets, and the grooves are formed on opposite sides of the cut-out circular gasket material, for example, with the circular gasket material mounted on a lathe. The resulting isolation gasket for embodiments of the invention has the stability and/or rigidity of a metal gasket with a stainless steel core having excellent corrosion resistance properties, while the glass reinforced epoxy laminated to the opposing surfaces of the gasket provides excellent isolating properties.

As likewise previously noted, another important aspect of embodiments of the invention is the seating of a suitable type of seal in the grooves of the gasket body. Representative examples of seal options include spring energized PTFE seals, as well as other types of O-ring or soft material as a back-up seal, or metal seals coated, for example, with a softer isolating material, such as PTFE. As similarly previously noted, a further important aspect of embodiments of the invention is the shape of the grooves formed in the gasket body. A factor in selecting one or more of the groove shapes previously described is the particular type of seal that is intended to be used. As internal pressure acts on the seal, the shape of the groove provides support for the seal and helps prevent the seal from blowing out. Thus, as will be readily recognized by one of skill in the art, a groove with a particular cross section may provide better support and enable better sealing characteristics for a particular type of seal element than a groove with a different cross section.

The previous description of the disclosed embodiments is provided to enable a person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A sealing device for use between joined pieces in a flow line that is operative for fluid passage therethrough, comprising:
   a flat metal plate having opposing side surfaces and an opening formed therein to allow fluid passage therethrough;
   a layer of dielectric material disposed on opposing side surfaces;
   a pair of inner grooves and a pair of outer grooves formed on said opposing side surfaces, at least one of which penetrate through said layer of dielectric material and into said metal plate and which extend completely around said opening, wherein said pair of inner grooves have substantially identical diameters and said pair of outer grooves have substantially identical diameters greater than the diameter of the inner grooves and wherein said inner grooves comprise a first depth and said outer grooves comprise a second depth greater than said first depth;
   a primary seal element disposed in said inner groove;
   a secondary seal element disposed in said outer groove; and
   a compression limiter.

2. The sealing device of claim 1, wherein said metal plate further comprises a flat annular metal plate.

3. The sealing device of claim 1, wherein said layer of dielectric material is laminated to each of said opposing side surfaces.

4. The sealing device of claim 1, further comprising inner and outer grooves formed on each of said opposing side surfaces, each of which penetrates through said layer of dielectric material and into said metal plate, and each of which extends completely around said opening.

5. The sealing device of claim 1, wherein said at least one groove has a cross section that is one of a rectangular shape, an isosceles trapezoid shape, a trapezoid shape, and a parallelogram shape.

6. The sealing device of claim 1, wherein said primary seal element comprises a PTFE spring energized lip seal.

7. The sealing device of claim 1, wherein said primary seal element comprises an O-ring seal element.

8. The sealing device of claim 1, wherein said secondary seal element comprises an annular metal body seal element.

9. The sealing device of claim 8, wherein annular metal body seal element has a coating of dielectric material.

10. The sealing device of claim 8, wherein said annular metal body seal element comprises an E-ring seal element.

11. The sealing device of claim 1, wherein said compression limiter is disposed in said outer groove adjacent to said secondary seal element.

12. A sealing device for use between joined pieces in a flow line that is operative for fluid passage therethrough, comprising:
   a flat metal plate having opposing side surfaces and an opening formed therein to allow fluid passage therethrough;
   a layer of dielectric material disposed on at least one of said opposing side surfaces;
   an inner groove and an outer groove formed on at least one of said opposing side surface, at least one of said grooves penetrating through said layer of dielectric material and into said metal plate, said inner and outer grooves extending completely around said opening, wherein said inner groove has a first depth and said second groove has a second depth greater than the first depth; and
   an annular metal seal element coated with an dielectric material and a compression limiter acting on said annular metal seal element.

13. The sealing device of claim 12 wherein said compression limiter is an annular metal ring disposed in said outer groove adjacent to said annular metal seal.

14. The sealing device of claim 13 wherein said compression limiter is coated with a dielectric material.

15. The sealing device of claim 12 wherein said compression limiter comprises the flat metal plate and dielectric material, the second depth of said outer groove selected such that said annular metal seal is not overcompressed when said layer of dielectric material is reduced.

* * * * *